May 3, 1960
O. C. CLARK
2,935,290
AUTOMATIC CUT-OFF VALVES
Filed Nov. 17, 1958
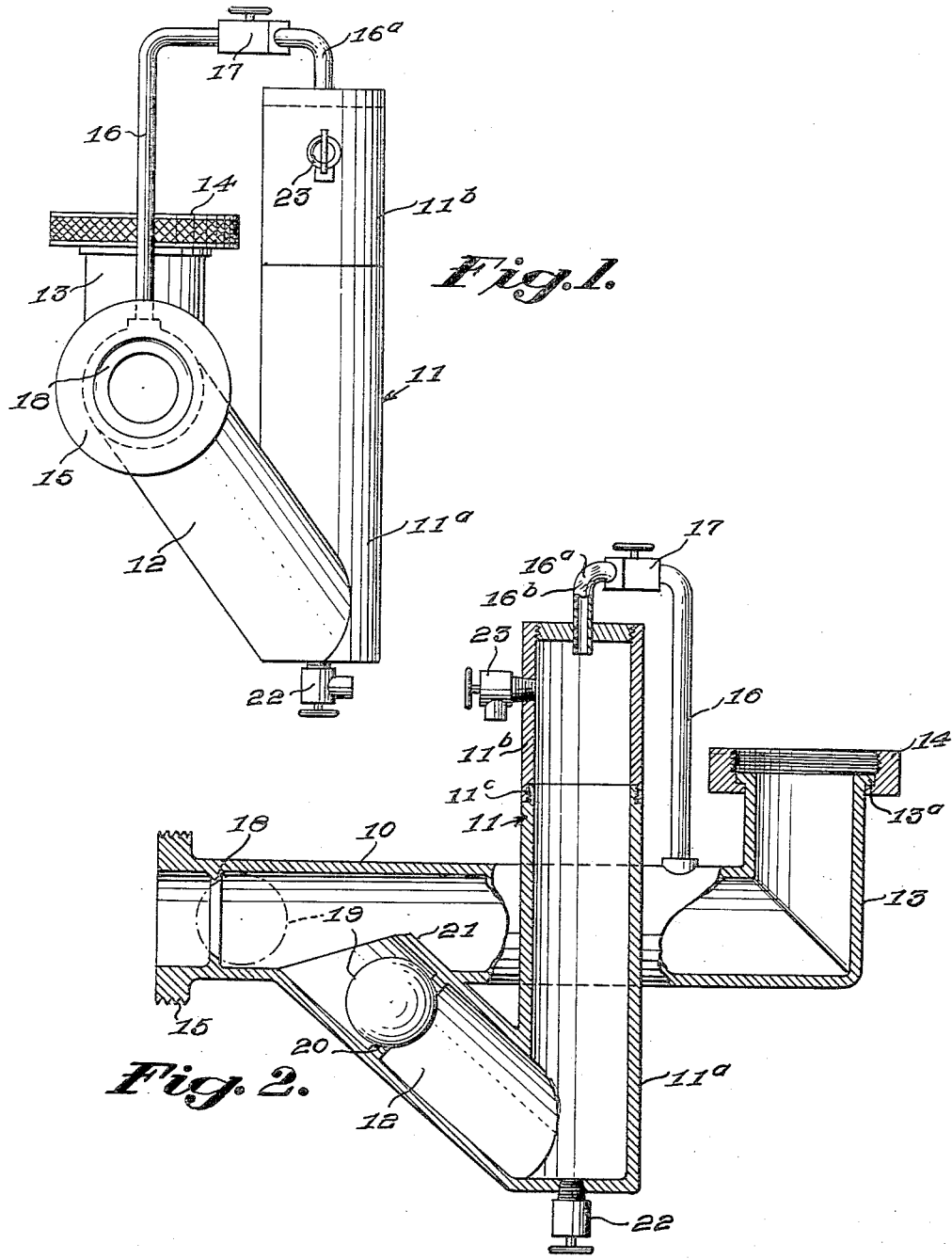
INVENTOR
Orvill C. Clark
By Stone & Mack
ATTORNEYS.

United States Patent Office 2,935,290
Patented May 3, 1960

2,935,290

AUTOMATIC CUT-OFF VALVES

Orvill Clarence Clark, El Paso, Tex.

Application November 17, 1958, Serial No. 774,190

4 Claims. (Cl. 251—15)

This invention relates to an automatic cut-off valve.

The invention is more particularly concerned with an improved valve structure for operative disposition between a water source and a water hose for automatically interrupting the flow of water through the hose after a predetermined period of time A primary object of the invention is the provision of an automatic cut-off valve for the above stated purpose which is relatively small in size, simple in construction, and which is rendered operative by the flow and pressure of water passing therethrough.

A further object of the invention is the provision of an automatic cut-off valve wherein the timing of the period of operation thereof may be varied at will, either before or after the flow of water begins.

A still further object of the invention is the provision of an automatic cut-off valve which will permit a predetermined volume of water to be dispensed through a sprinkling system incorporating the valve regardless of variations of water pressure from the supply system and which is adaptable for use with all types of lawn sprinkling systems.

Other objects and advantages of the invention will become apparent in the course of the following detailed description, taken in connection with the accompanying drawing, wherein:

Fig. 1 is an end elevational view of the improved valve.

Fig. 2 is a view partly in side elevation and partly in vertical section as observed from the right of Fig. 1.

Referring now in detail to the drawing, the improved valve structure will be seen to comprise two cylindrical casings 10 and 11 of which casing 10 in the use of the valve is disposed horizontally while casing 11 is disposed vertically, or at right angles to casing 10.

For purposes of assembly and cleaning the casing 11 may be constructed of two parts 11ª and 11ᵇ which are threadedly connected at 11ᶜ.

The casings 10 and 11 are interconnected by a third casing 12 which communicates with the lower end of casing 11 and communicates with casing 10 adjacent the water discharge end thereof.

The horizontal casing 10 at one end thereof is unitary with a cylindrical vertical portion 13 whose upper free end is provided with an outwardly projecting flange 13ª with which is engaged an internally threaded coupling 14 for connection with a faucet or other water source, while the opposite end of casing 10 is provided with an externally threaded portion 15 for operative connection with a hose.

A by-pass tube 16 has one end thereof threaded into casing 10 and the upper end of such tube is of generally inverted U-form with a leg 16ª thereof projecting into the upper end of casing 11.

A metering valve 17 is interposed in the tube 16 of the inverted U-form portion thereof.

The casing 10 adjacent its discharge end is provided with an inwardly facing valve seat 18 for cooperating with a float-type ball check valve 19 and the casing 12 is provided with an outwardly facing valve seat 20 for cooperating with the ball check valve 19. As is clearly indicated in Fig. 2 the casing 12 projects into the casing 10 providing a protrusion 21 for a purpose later to appear. The lower end of casing 11 is provided with a pet cock 22 while the upper end thereof is provided with a pet cock 23.

Having set forth the construction of the improved valve, the operation thereof is as follows.

Upon opening the faucet with which coupling 14 is engaged, a certain amount of water pressure caused by a sprinkler attached at the threaded portion 15 of casing 10 will be present in the horizontal casing 10.

In the absence of pressure at this time on the underside of the seated ball check valve 19, the pressure in casing 10 will hold the valve against the valve seat 20 thus forming a water tight seal between the horizontal casing 10 and the vertical casing 11. A small volume of the water under pressure in the horizontal casing 10 is by-passed through the by-pass tube 16 and through the metering valve 17 and into the vertical casing 11. The water in the by-pass tube 16 is metered into the vertical casing 11, a certain number of drops thereof per second or a certain number of seconds per drop to provide the timing of the operation. As the water being metered into the vertical casing 11 rises, the pressure in the vertical casing will also rise.

This pressure will react on the under side of the ball check valve 19. When the pressure in the vertical casing 11 is equal to the pressure in the horizontal casing 10 the ball check valve 19 will, because of its buoyancy, rise from the seat 20. At this time the forward movement of the water through the horizontal casing 10 will urge the ball check valve 19 towards a seating position on the valve seat 18.

The pressure of water from the source of supply thereof will hold the ball check valve against the valve seat 18, thus providing a water tight seal between the faucet at the source of supply and an attached hose which may be in communication with a lawn sprinkler.

A new cycle of operation of the valve requires that the faucet be turned off and pet cock 22 on the lower end of casing 11 be opened to drain water therefrom.

The opening of the pet cock 23 at the upper end of casing 11 prevents formation of a vacuum and permits complete drainage of the valve. After the valve has been drained gravity will cause the ball check valve to move away from the valve seat 18 and return to a seating position on the valve seat 20.

At this point, it is to be observed that the protrusion 21 of the casing 12 within the horizontal casing 10 provides for deflection of the ball check valve into the mouth of the elbow casing 12.

The time delay experienced between equalizing water pressure in the vertical casing 11 with water pressure in the horizontal casing 10, through the by-pass tube 16 and metering valve, is the period of time in which the valve will permit an uninterrupted flow of water to a sprinkling system. The time delay between equal water pressure in the horizontal casing 10 and the vertical casing 11 is controlled by the metering valve 17. The metering valve 17 is adjusted for a predetermined number of drops of water per second falling through the by-pass tube from the outlet of the metering valve into the vertical casing. The by-pass tube may be transparent in a zone thereof as indicated at 16ᵇ for permitting visual regulation. A table or chart may be supported by the vertical casing 11 offering instruction in regulation of the metering valve.

I claim:

1. An automatic cut-off valve for operative disposition between a water pressure source and a water conducting hose; comprising a vertical casing, a second casing disposed in transverse relation to said vertical casing and having an inlet and an outlet on opposite ends thereof, a third casing having one end thereof in communication with said vertical casing adjacent its lower end and having the other end thereof in communication with said second casing inwardly of said outlet, a pair of opposing valve seats, one in said second casing between said outlet and the point of communication between said third casing and said second casing and the other in said third casing, a float-type ball check valve freely disposed between said seats, said valve normally engaging said seat in said third casing under action of gravity and a restricted by-pass tube in communication with said second casing and the upper end of said vertical casing for conducting water from said second casing to a position beneath said ball check valve for causing same to engage said seat in said second casing and thereby check the flow of water therethrough.

2. An automatic cut-off valve according to claim 1, wherein said by-pass tube is provided with a metering valve for varying the time interval between engagement of said valve with one and the other of said valve seats and a corresponding time interval of the flow of water through said second casing.

3. An automatic cut-off valve according to claim 1, wherein said vertical casing is provided with two pet cocks, one adjacent its upper end and one adjacent its lower end.

4. An automatic cut-off valve according to claim 1, wherein said third casing protrudes within said second casing at a position between said valve seats for directing movement of said valve from said first seat to said other seat under action of gravity.

References Cited in the file of this patent

UNITED STATES PATENTS

| | | |
|---|---|---|
| 1,568,720 | Buelna | Jan. 5, 1926 |
| 1,921,698 | Price | Aug. 8, 1933 |
| 2,262,317 | Edwards | Nov. 11, 1941 |